(12) United States Patent
Porte et al.

(10) Patent No.: US 9,102,413 B2
(45) Date of Patent: Aug. 11, 2015

(54) FASTENING DEVICE PARTICULARLY SUITABLE FOR THE FASTENING BETWEEN AN AIR INTAKE AND AN ENGINE OF AN AIRCRAFT NACELLE

(75) Inventors: Alain Porte, Colomiers (FR); Stephane Dida, Fontenilles (FR); Matthieu Fargues, Montauban (FR); Martial Marro, Plaisance du Touch (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 337 days.

(21) Appl. No.: 13/566,410

(22) Filed: Aug. 3, 2012

(65) Prior Publication Data

US 2013/0033036 A1 Feb. 7, 2013

(30) Foreign Application Priority Data

Aug. 5, 2011 (FR) ...................................... 11 57195

(51) Int. Cl.
*B64D 33/02* (2006.01)
*F02C 7/047* (2006.01)

(52) U.S. Cl.
CPC ................ *B64D 33/02* (2013.01); *F02C 7/047* (2013.01); *B64D 2033/0206* (2013.01); *B64D 2033/0286* (2013.01); *F05D 2240/14* (2013.01); *Y02T 50/672* (2013.01); *Y10T 403/64* (2015.01); *Y10T 403/645* (2015.01)

(58) Field of Classification Search
CPC ....... F01D 25/243; F16D 1/033; F16D 1/076; F16B 7/182; F16B 5/02–5/0291; F16L 23/036; B64D 33/02; B64D 2033/0286; F02C 7/047; F05D 2240/14; Y02T 50/675
USPC ........................................ 403/335, 337, 408.1
See application file for complete search history.

(56) References Cited

U.S. PATENT DOCUMENTS

| | | | | |
|---|---|---|---|---|
| 3,592,421 | A * | 7/1971 | Kopp | 248/554 |
| 5,451,116 | A * | 9/1995 | Czachor et al. | 403/338 |
| 5,593,277 | A * | 1/1997 | Proctor et al. | 415/173.1 |
| 6,591,562 | B2 * | 7/2003 | Ting | 52/235 |
| 6,641,326 | B2 * | 11/2003 | Schilling et al. | 403/337 |
| 6,783,324 | B2 * | 8/2004 | Muny | 415/144 |
| 6,857,669 | B2 | 2/2005 | Porte | |

(Continued)

FOREIGN PATENT DOCUMENTS

| | | |
|---|---|---|
| EP | 1 369 555 | 12/2003 |
| WO | 2008/006959 | 1/2008 |

OTHER PUBLICATIONS

French Search Report dated Apr. 11, 2012 for French Priority Application No. 1157195.

*Primary Examiner* — Michael P Ferguson
*Assistant Examiner* — Nahid Amiri
(74) *Attorney, Agent, or Firm* — Dickinson Wright PLLC

(57) ABSTRACT

A fastening device includes a first annular flange connected to an air intake, a second annular flange connected to a powerplant pressed against the second annular flange and fastening elements that allow the annular flanges to be linked. For at least a first fastening element, a blade is fitted between the first fastening element and the first annular flange, the blade including at least a central part linked to the first fastening element, radially mobile relative to the first annular flange, and at least one offset part for which at least radial centripetal displacement is limited relative to the first annular flange, the central part and the offset part being offset relative to one another along the direction of the circumference.

8 Claims, 4 Drawing Sheets

(56) References Cited

U.S. PATENT DOCUMENTS

| | | |
|---|---|---|
| 7,056,053 B2 * | 6/2006 | Schilling et al. ............. 403/337 |
| 7,147,429 B2 * | 12/2006 | Czachor et al. .................. 415/9 |
| 7,185,499 B2 * | 3/2007 | Chereau et al. ................ 60/796 |
| 7,260,892 B2 * | 8/2007 | Schilling et al. .......... 29/889.21 |
| 7,694,388 B2 * | 4/2010 | Campbell et al. ............... 16/239 |
| 2004/0007422 A1 | 1/2004 | Porte |
| 2004/0101384 A1 | 5/2004 | Schilling |
| 2008/0078612 A1 | 4/2008 | Strunk |
| 2010/0000227 A1 | 1/2010 | Porte |

* cited by examiner

FASTENING DEVICE PARTICULARLY SUITABLE FOR THE FASTENING BETWEEN AN AIR INTAKE AND AN ENGINE OF AN AIRCRAFT NACELLE

FIELD OF THE INVENTION

The present invention concerns a fastening device especially adapted to ensure the fastening between an air intake and the powerplant of an aircraft nacelle.

BACKGROUND OF THE INVENTION

An aircraft propulsion system includes a nacelle in which a powerplant is arranged in an essentially concentric layout connected to the rest of the aircraft by a strut.

As shown in FIG. 1, the nacelle has an air intake (10) at the front that allows the air flow to be channeled in the direction of powerplant (12).

The air intake (10) is comprised of a lip (14) whose surface in contact with the aerodynamic flow is prolonged in the interior of the nacelle by an internal conduit (16) and on the exterior of the nacelle by an external wall (18).

The air intake (10) is connected to powerplant (12) by a fastening device illustrated in detail in FIGS. 2, 3A, and 3B. This fastening device is comprised at the powerplant level of a first annular flange (20) attached to a second annular flange (22) of a panel delimiting conduit (16) or of in-between piece (24), called a strap, connected to the panel delimiting conduit (16), as shown in FIG. 2. The two flanges (20) and (22) are placed one against the other and kept there by fastening elements, for example bolts or rivets (26), that go through flanges (20) and (22) and extend parallel to the longitudinal axis of the nacelle.

In accordance with the mode of production illustrated in FIG. 3A, the bolts or rivets (26) are made up of a shank (28) whose diameter can be adjusted to that of the passage holes made in the annular flanges (20) and (22).

In accordance with a second mode of production, shown in FIG. 3B, the passage 5 holes made in annular flanges (20) and (22) can be slightly larger in diameter than that of the shank (28) of the bolts or rivets (26). This play, of around 1 mm, between the passage holes and the bolts or rivets, allows relative movement between the two attached pieces.

In both cases, the passage holes are cylindrical.

The fastening device and especially the bolts or rivets (26) are sized to offset any possible risk of incidents, such as, for example, the fracture of a fan blade.

In that case, the conduit of the powerplant can be deformed along all or part of its circumference. At the time of the deformation, the passage holes of the annular flange of the powerplant are no longer in line with those of the air intake. In this configuration, the bolts or rivets (26) are particularly subject to some relatively strong shear stresses, significantly greater than the stresses present under normal operations. Even if use of the second mode of production has allowed relative movement between the two joined pieces as the result of the play present around the bolts or rivets (26), this play is clearly less than the relative movement between the two joined pieces occurring in the case of an incident like the fracture of a blade. In the case of the use of the second mode of production with play, it can be noted that the shear stresses are at least equal to or greater than those present when the first mode of production is used.

In order to be able to resist such stresses, the fastening device consists of a given number of bolts or rivets (26) with a given diameter.

Taking into consideration the resistance of a bolt or rivet (26) in an installation that conforms to the modes of production illustrated in FIGS. 3A and 3B, this leads to planning for a great number of bolts or rivets (26) in the fastening device and/or bolts and rivets (26) with a large diameter which results in a greater embarked mass and consequently greater aircraft fuel consumption.

According to another scenario, the powerplant conduit deformations tend to spread in the direction of air intake conduit (16). As a result, during the design of air intake conduit (16), which is generally made up of composite material and includes a noise suppression system, one must take into consideration these possible deformations.

To limit the spread of the deformation of the powerplant annular flange (20) towards the air intake annular flange (22), it is possible to provide a filter at the level of bolts or rivets (26). For each fastening device, this filter is comprised of at least a deformable sheath (30) slipped on to the shank (28) of bolt or rivet (26). As seen in the example shown in FIG. 3A, the deformable sheath is inserted between the annular flange (20) connected to the powerplant and a nut (32) of the bolt or rivet (26). This deformable sheath (30) has an internal diameter adjusted to that of the shank (28) and is comprised of a central portion of relatively little thickness, in order to allow it to deform, especially by buckling. This lay-out allows an increase in the energy absorbed by the deformation of the fastening device. It also allows limiting the spread of the deformations along the direction of the axis.

However, in case of the fracture of a blade, the greatest deformations are oriented in a radial direction. However, the effects of the deformable sheath (30) in that direction are limited.

SUMMARY OF THE INVENTION

Also, the present invention aims to offer a fastening device better adapted to connect a powerplant and an air intake of an aircraft nacelle that would provide a limitation of the spread of deformation between the two assembled elements especially in a radial direction.

To this end, the invention's goal is a fastening device between a first air intake conduit of an aircraft nacelle and a second powerplant conduit included in the same nacelle, the two conduits being arranged end to end, the fastening device in question being comprised of an annular flange connected to the air intake, an annular flange connected to the powerplant attached to said air intake annular flange, a multiplicity of passage holes arranged in the annular flanges and arranged to the right of each other and some fastening elements whose shanks are inserted in the passage holes which connect the annular flanges in question. For at least a first fastening element, the passage hole of one of the annular flanges has a diameter clearly greater than the diameter of the shank, that allows play of the said shank, in that a blade is fitted between said first fastening element and said annular flange, the blade being made up of two parts; at least one central part, connected to the first fastening element, radially mobile with respect to said annular flange, and at least one part offset, of which at least the centripetal radial offsets are limited with respect to the said annular flange, the two parts being offset in a circumferential direction.

BRIEF DESCRIPTION OF THE DRAWINGS

Other characteristics and advantages will come out in the description of the invention which follows: a description provided only as an example, with regard to the attached figures, on which.

DETAILED DESCRIPTION OF THE INVENTION

Figure 5A:
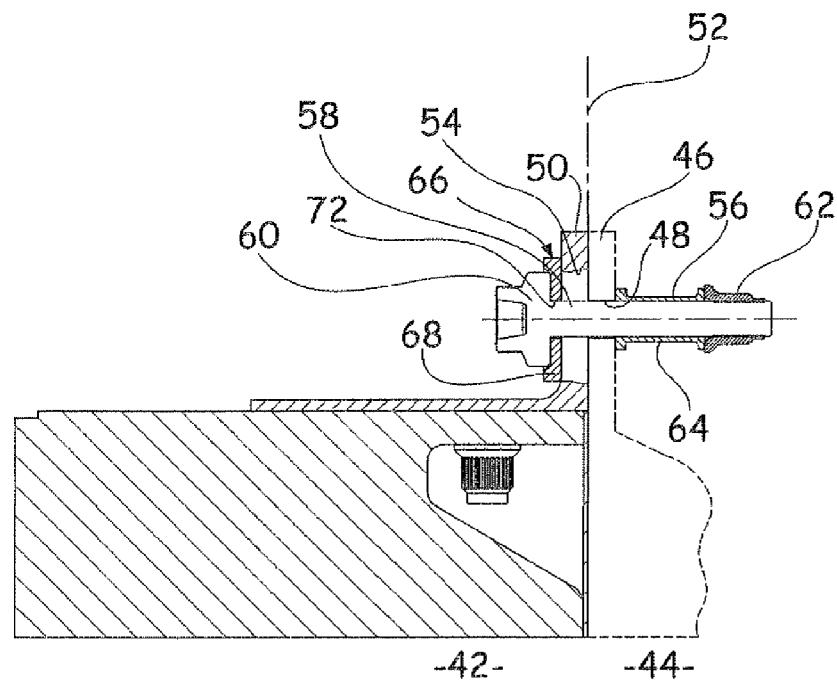
FIG. 5A is a cutaway of the connection between a powerplant and an aircraft nacelle air intake according to the invention.
Figure 5B:
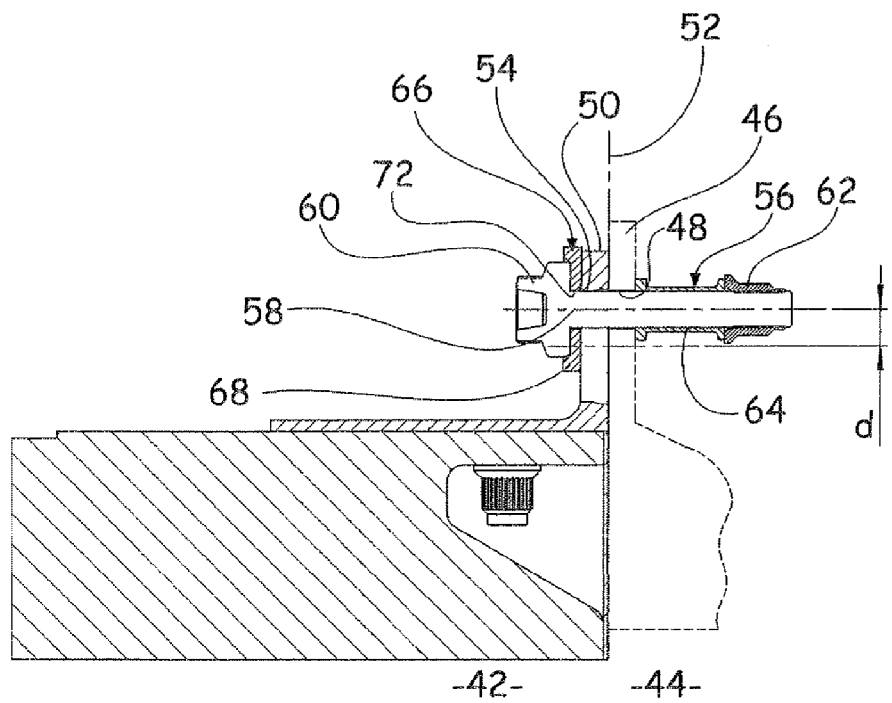
FIG. 5B is a cutaway of the connection shown in FIG. 5A after deformation.

FIGS. 5A and 5B use a cutaway to represent the junction zone between first an air intake conduit (42) and second a powerplant conduit (44) of an aircraft nacelle, both conduits being placed end-to-end. The cutaway plan contains the nacelle longitudinal axis and the axis of a fastening element.

According to one mode of production, the fastening device between a powerplant and an air intake is made up, at the powerplant level, of an annular flange (46) extending on a plane essentially perpendicular to the longitudinal axis of the nacelle and a multiplicity of passage holes (48), at the air intake level an annular flange (50) extending on a plane essentially perpendicular to the longitudinal axis of the nacelle laid against the annular flange (46) of the powerplant at the level of a referenced junction point (52) and with a multiplicity of passage holes (54) positioned in line with the powerplant holes (48) and fastening elements (56) distributed along the periphery of annular flanges (46) and (50) positioned in passage holes (48) and (54).

Figure 1:
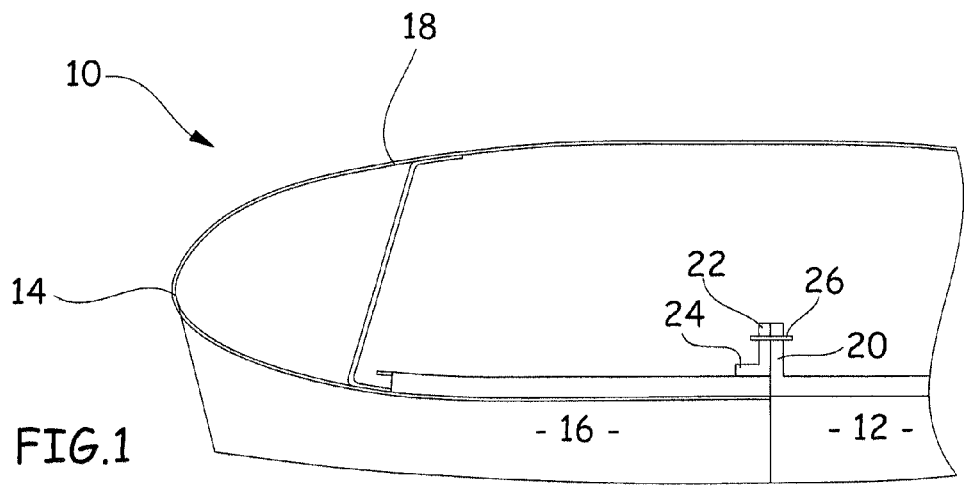
FIG. 1 is a schematic cutaway according to a radial plan of the front part of an aircraft nacelle.
Figure 2:
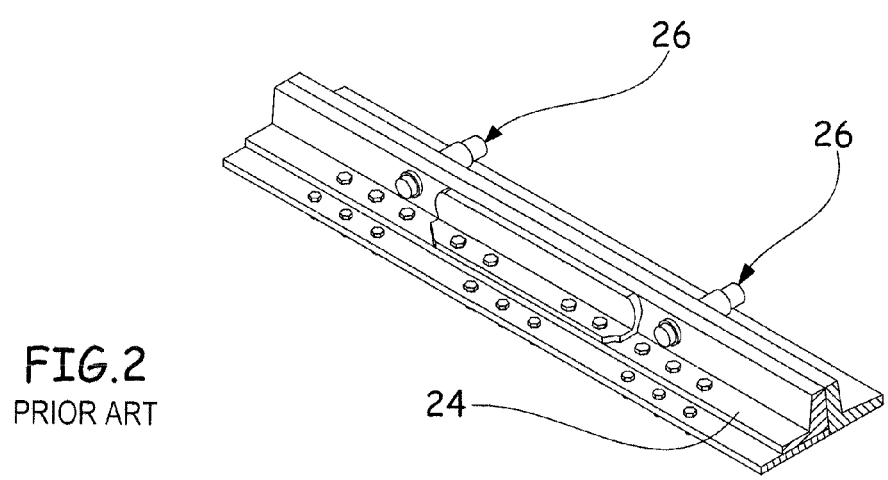
FIG. 2 is a perspective view illustrating part of the connection between powerplant and an air intake of an aircraft nacelle according to the previous view.
Figure 3A:
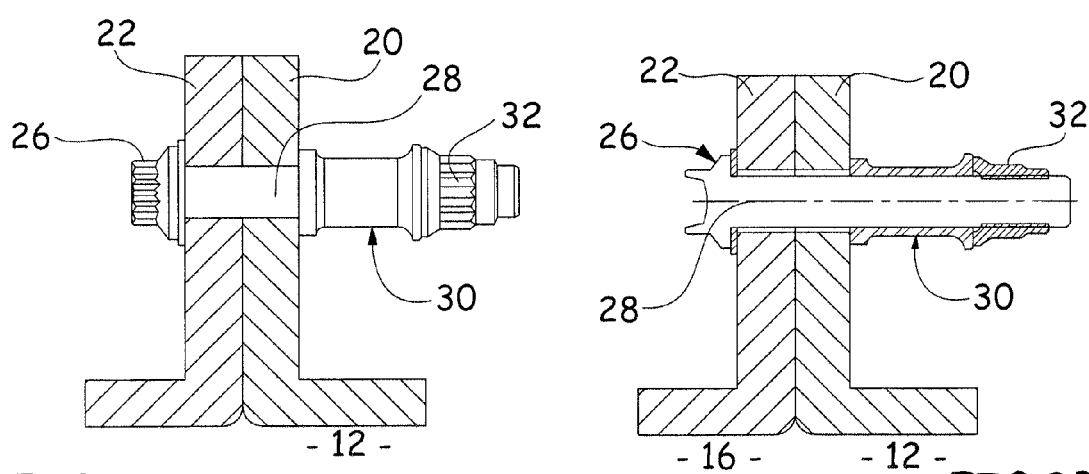
FIG. 3A is a cutaway showing a fastening element between a powerplant and an air intake of an aircraft nacelle in accordance with the first mode of production of the previous view.
Figure 3B:
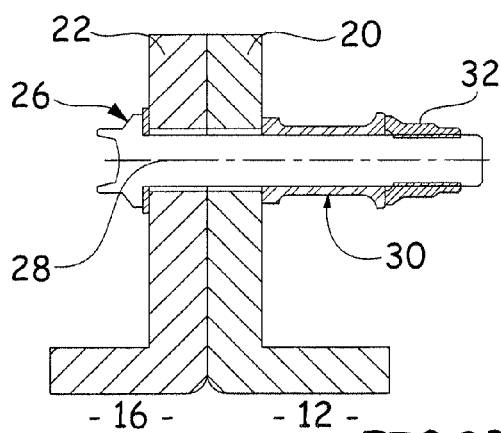
FIG. 3B is a cutaway showing a fastening element between a powerplant and an air intake of an aircraft nacelle in accordance with another mode of production of the previous view.
Figure 4:
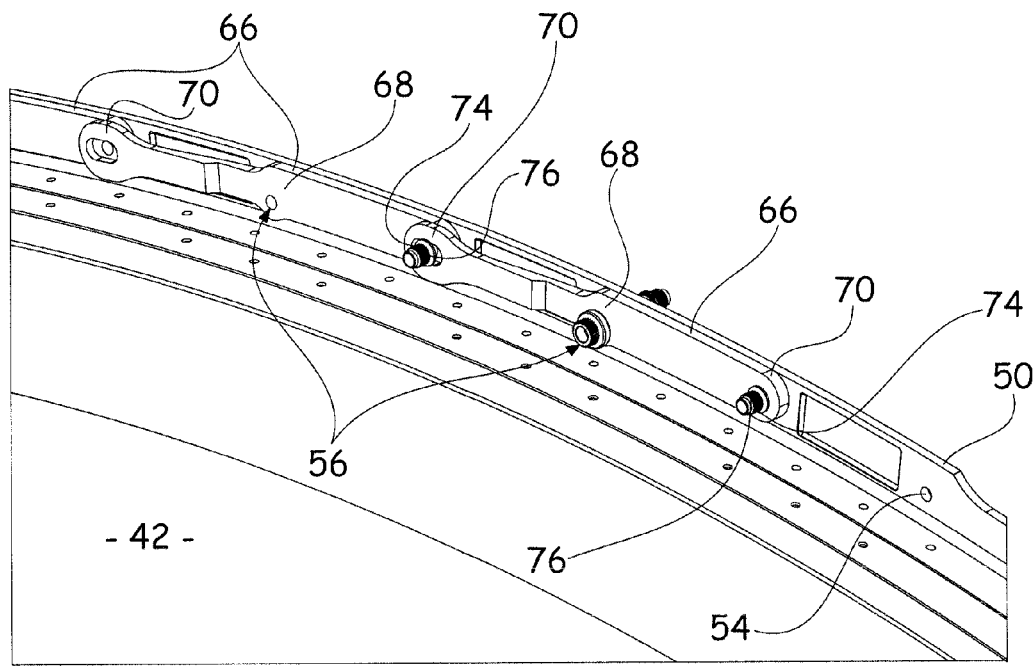
FIG. 4 is a perspective view of a part of the connection between a motor and an air intake of an aircraft nacelle according to a first variant of the invention.

According to one mode of production, the annular flange can be made integral with the powerplant or the air intake. As a variant, the annular flange can be an independent piece assembled to the powerplant or air intake. According to another mode of production, the annular flange (50) integral to the air intake is formed in one piece with a portion of the cylinder, in such a way as to form a bracket with one L section along the longitudinal plane as shown in FIG. 4. In the same way the annular flange (50) can be extended integrally along the entire circumference or be constituted as several angular sections.

Each fastening element (56) is comprised of a shank (58) in the form of a cylinder with at one end a first shoulder (60) capable of being pressed against the open face of one of the flanges, in this case air intake annular flange (50), and at the other end a second shoulder (62) capable of being pressed against the open face of the other flange, in this case powerplant annular flange (46).

According to one mode of production, a fastening element (56) can be in the form of a bolt, with one part a screw having a shank, with at one end a head (corresponding to the first shoulder (60)) and at the other end threads and a nut (corresponding to the second shoulder (62)), screwed on to the end of the screw.

As a variant, the fastening element could be in the form of a rivet with a shank, with at one end a head forming the first shoulder and whose other end is deformed so as to form the second shoulder.

Advantageously, fastening element 56 has a deformable sheath (64) which may be slipped on to shank (58) and placed between one of the flanges and one of the shoulders. As illustrated in the example, the deformable sheath (64) is sandwiched between powerplant annular flange (46) and shoulder (62) formed by a nutof the fastening element. This deformable sheath (64) has an internal diameter adjusted to that of shank (58) and its central portion is of relatively little thickness in order to enable it to deform, essentially by buckling. This arrangement increases the amount of energy absorbed by the deformation of the fastening element and therefore limits the spread of deformation oriented along the axis.

The invention proposes a fastening device which allows the use of plastic and elastic deformation to absorb part of the energy produced from the shock of a piece of blade against the powerplant conduit and limits the spread of deformation, especially in a tangential direction.

The particular arrangement of the invention is described as it applies to the annular flange (50) integral to the air intake. It could be applied to the annular flange (46) integral to the powerplant.

Even though it is described for one fastening element, it is applicable to at least one fastening element (56) and by preference to all the fastening elements (56).

According to the invention, passage hole (48) of the annular flange (46) integral to the powerplant has a diameter adjusted to the diameter of shank (58) of fastening element (56). Thus, the relative movement between fastening element (56) and annular flange (46) is essentially non-existent. By adjusted, it is meant that the play between passage hole (48) and the shank is equal to or less than 2 mm.

Similarly, passage hole (54) of annular flange (50) has a diameter clearly larger than that of shank (58) so as to allow the said shank (58) play equal to or greater than 5 mm.

As an advantage, the axis of the passage hole (54) is offset towards the exterior relative to the axis of passage hole (48) in such a way as to obtain maximum displacement, knowing that shank (58) will be displaced radially towards the outside in the case of a blade fracture. In the absence of deformation, as shown in FIG. 5A, the portion of the circumference of passage hole 54 closest to the longitudinal axis of the nacelle is significantly at the same height as the corresponding portion of the circumference of passage hole 48, while the portion of the circumference of the passage hole (54) the furthest away from the longitudinal axis of the nacelle is offset towards the exterior relative to the corresponding portion of the circumference of passage hole (48).

According to the invention, a blade (66) is set between at least one fastening element (56) and annular flange (50), blade (66) including at least two parts, at least one central part (68) attached to fastening element (56), radially mobile relative to said annular flange (50), and at least one offset part (70) whose centripetal radial displacements are at least limited relative to annular flange (50), the two parts (68) and (70) being offset along the direction of the circumference.

The central portion (68) includes a passage hole (72) whose diameter is adjusted to that of shank (58) of fastening element (56).

According to the invention, at least one stop (74) is planned to limit the movement of offset part (70) along a centripetal radial direction.

Figure 7A:
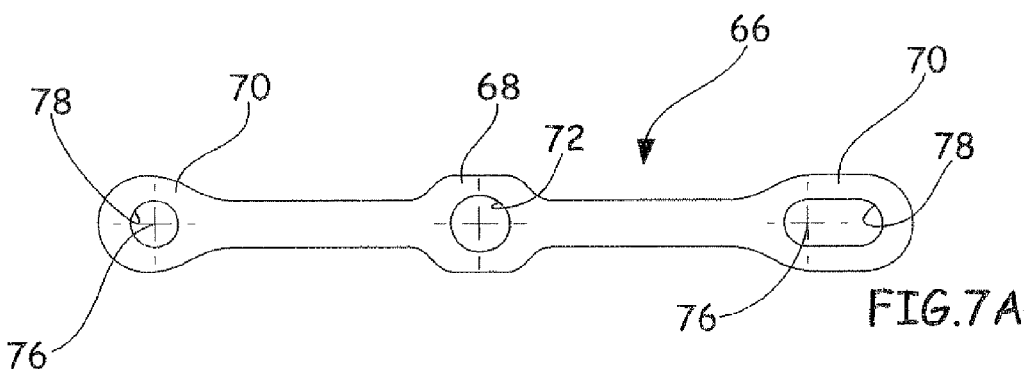
FIG. 7A is a front view of a blade according to the first mode of production for the invention, without deformation.
Figure 7B:
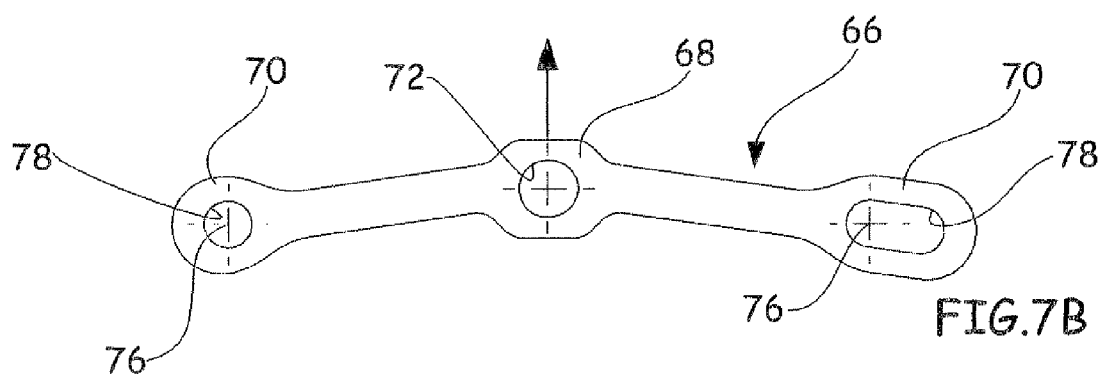
FIG. 7 B is a front view of the blade in FIG. 7A with deformation.

According to one mode of production, the stop (74) is made up of the shank of a fastening element (76) secured to the annular flange (50). Similarly, the offset part (70) includes a passage hole (78) whose dimension in the radial direction is adjusted to the diameter of the shank of the fastening element (76). This fastening element (76) may be a screw, a bolt or a rivet. By preference, passage hole (78) is an oblong hole whose dimension along the radial direction is adjusted to the diameter of the shank of fastening element (76) while the dimension along the direction of the circumference is greater than the diameter of the shank to allow movement of the offset part (70) in the circumferential direction relative to fastening element (76) as shown in FIGS. 7A and 7B.

According to another mode of production, stop (74) includes at least one raised element (80) secured to annular flange (50) able to press against the edge of the offset part (70) oriented towards the exterior so that the raised element (80) (a solid line in FIGS. 8 and 9) limits the movement of offset part (70) along the centripetal radial direction. As a variant, one might consider two raised elements (80 and 80') (raised element 80' being shown as a dotted line in FIGS. 8 and 9) arranged on either side of the offset part (70) in a radial direction.

Figure 9:
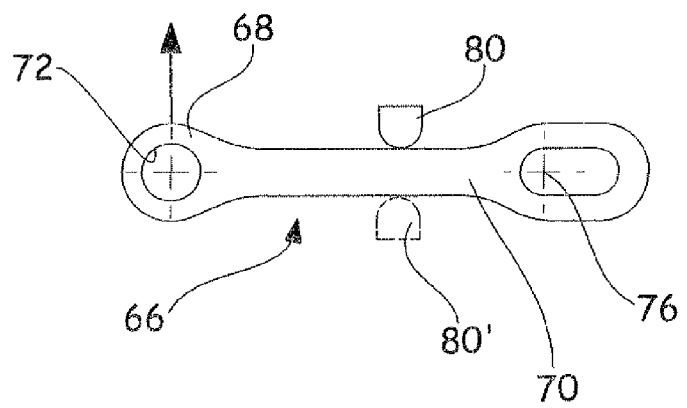
FIG. 9 is a front view of a blade according to a third mode of production.

According to other modes of production, it is possible to envisage for the same blade (66) some stops in the form of fastening elements (76) and in the form at least of one raised element as shown in FIG. 9.

According to certain variants, blade (66) includes, for each fastening element (56) a central part (68) and a single offset part (70) as shown in FIG. 9.

Figure 8:
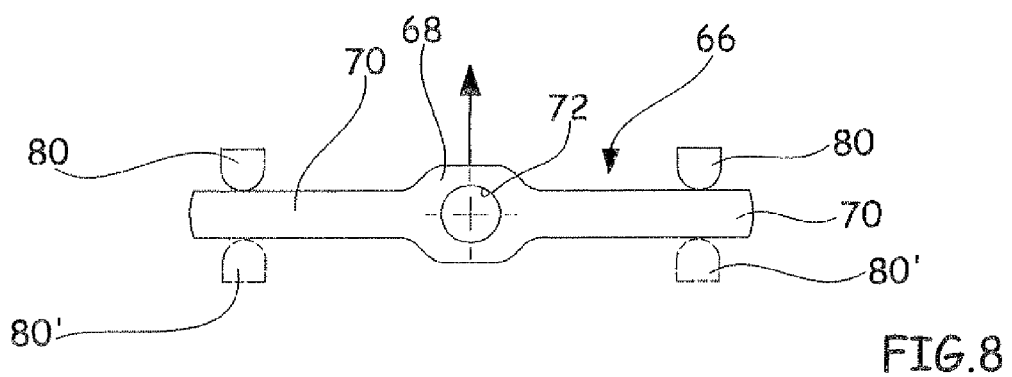
FIG. 8 is a front view of a blade according to a second mode of production.

According to other variants shown in FIGS. 7A, 7B and 8, blade (66) includes a central part (68) for a fastening element (56) and two offset parts (70) positioned on either side of fastening element (56), the two offset parts (70) being offset relative to fastening element (56) along the direction of the circumference. As an advantage, passage hole (78) of one offset part is oblong while the passage hole (78) of the other offset part is circular and adjusted to the section of fastening element (76).

According to certain variants shown in FIGS. 4, 7A, 7B, 8 and 9, a blade (66) is planned for each fastening element (56). By preference, the adjacent blades (66) have at least one stop (74) in common, as shown in FIG. 4. Fortunately in this case, the circular passage hole in one blade is superposed over the oblong passage hole of a second blade.

Figure 6:
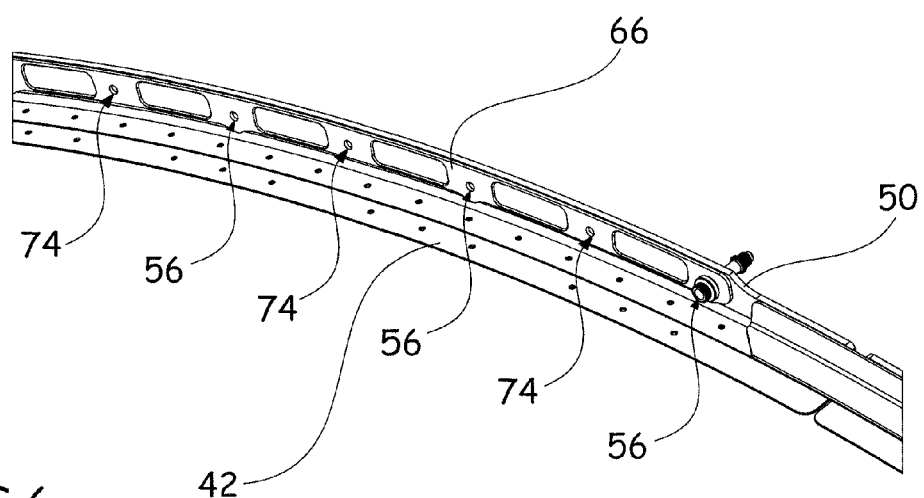
FIG. 6 is a perspective view of a part of the connection between a powerplant and an aircraft nacelle air intake according to another variant of the invention.

According to other variants, a blade may have several holes (72) each one destined to have a fastening element (56). So, according to the mode of production shown in FIG. 6, several fastening elements (56) are linked to the same blade.

In case of the fracture of a blade, the powerplant conduit (44) deforms radially, as shown in FIG. 5B. This deformation causes a radial movement of at least one fastening element (56) towards the exterior of the nacelle. Passage hole (54) of the annular flange (50) allows this movement of fastening element (56). Similarly, passage hole (72) with a diameter adjusted to that of the shank of fastening element (56), the central part (68) of blade (66) follows the movement of fastening element (56) contrary to the central part to the offset part (70) of the blade which is along the radial direction and cannot offset towards the exterior.

According to a characteristic of the invention, the blade exerts a force on fastening element (56) that is proportional to the radial movement towards the exterior of fastening element (56). Thus, the more fastening element (56) tends to be displaced towards the exterior, the more blade (66) exerts an important force opposed to this displacement. So, the risk of shearing of fastening element (56) in case of a shock with the side of passage hole (54) is limited. To this effect, the cross section of the blade, the material of the blade, the distance between fastening element (56) and the nearest stop (74) are established so as to allow the blade to deform elastically and radially and exert on fastening element (56) a force proportional to the radial movement towards the exterior of the said fastening element (56).

The invention claimed is:

1. A fastening device between a first conduit of an aircraft nacelle air intake and a second conduit of a powerplant installed in said nacelle, the two conduits being installed end-to-end, said fastening device including:
    a first annular flange, linked to the air intake,
    a second annular flange linked to the powerplant pressed up against said air intake annular flange, wherein holes are arranged in the first and second annular flanges, respective holes in the first and second annular flanges being aligned with one another,
    fastening elements whose shanks are inserted into the holes, allowing link up of said first and second annular flanges, at least a first fastening element of said fastening elements having a shank with a diameter and the hole of one of the first and second annular flanges into which the first fastening element is inserted has a diameter greater than that of the shank allowing play of said shank, and
    at least one blade interposed between said first fastening element and said second annular flange, the blade comprised of at least two parts comprising at least one central part linked to the first fastening element, radially mobile relative to said second annular flange and at least one offset whose centripetal radial displacements at least are limited relative to said second annular flange, the two parts being offset in the direction of a circumference of the connecting device, wherein:
    the blade exerts a force on the first fastening element that is proportional to radial movement, towards the exterior, of the first fastening element,
    the central part comprises a passage hole through which the shank of the first fastening element passes and whose diameter corresponds to that of the shank of the first fastening element,
    the second annular flange supports at least one stop to limit movement of the offset part along a centripetal radial direction,
    said stop comprises a shank of a second fastening element of said fastening elements integral to the second annular flange, and
    the offset part of the blade includes a passage hole whose dimension in the radial direction is adjusted in diameter to that of the shank of the second fastening element.

2. The fastening device according to claim 1, wherein the passage hole is oblong, has a largest dimension oriented along the circumferential direction so as to allow movement in the circumferential direction of the offset part relative to the second fastening element.

3. The fastening device according to claim 1, further comprising at least one raised element integral with the second annular flange and wherein said stop cooperates with the at least one raised element integral with the second annular flange, the raised element for bearing against an edge of the offset oriented towards the exterior.

4. The fastening device according to claim 3, wherein said at least one raised element comprises two raised elements disposed on either side of the offset part orientated toward the exterior and the stop cooperates with said two raised elements.

5. The fastening device according to claim 1, wherein the blade includes a central part for one of the fastening elements and the at least one offset part comprises two offset parts disposed on either side of said one of the fastening elements, the two offset parts being offset relative to the one of the fastening elements along the direction of the circumference.

6. The fastening device according to claim 5, wherein the at least one blade comprises two adjacent blades include a stop in common, to limit movement of the offset parts of the adjacent blades in a centripetal radial direction.

7. The fastening device according to claim 1, wherein the at least one blade includes several passage holes each planned for a first fastening element.

8. The fastening device according to claim 1, wherein an axis of the passage hole of the annular flange connected to the air intake is offset towards the exterior relative to an axis of the passage hole of the annular flange connected to the powerplant.

* * * * *